Figure 1:
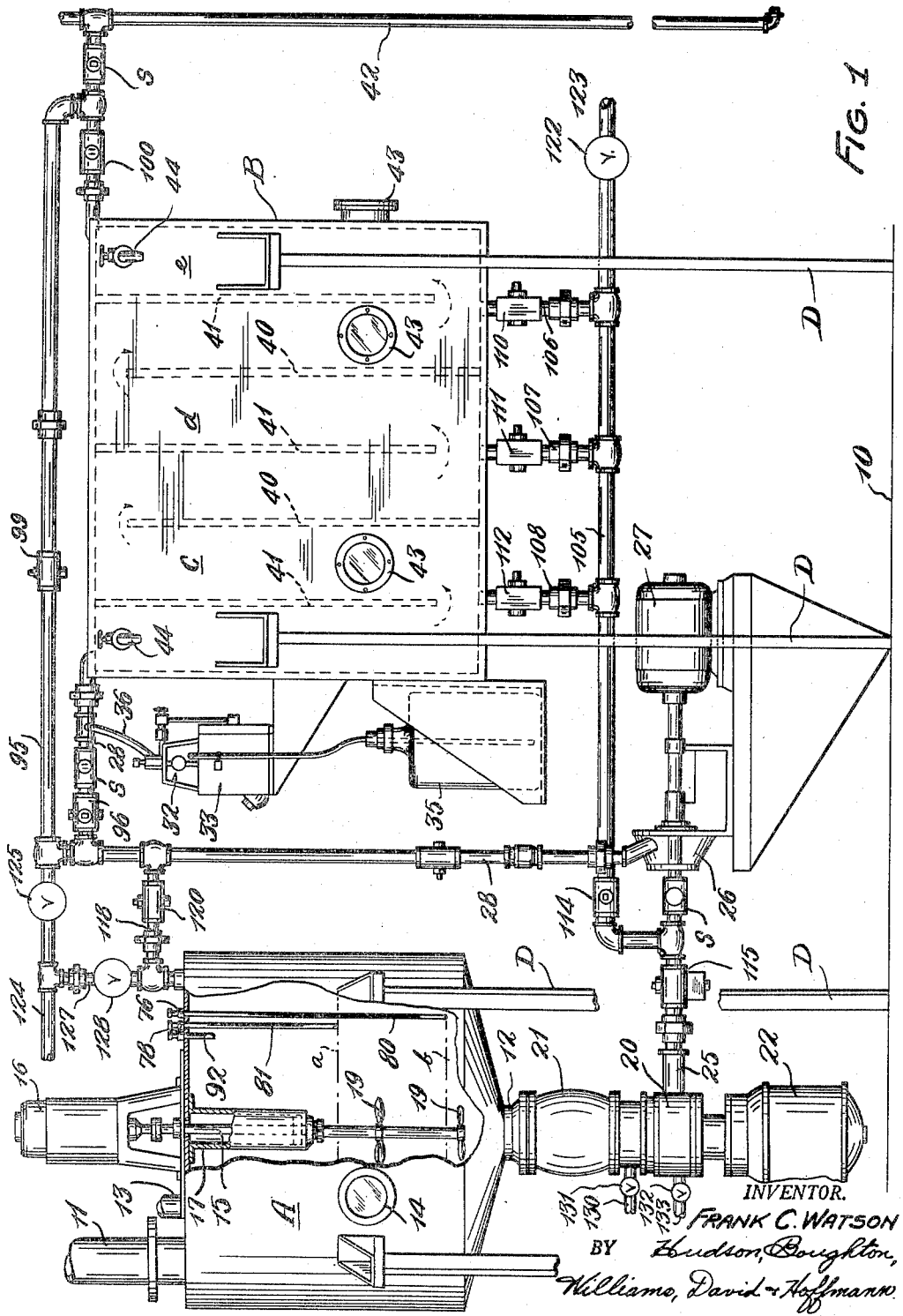

May 31, 1955  F. C. WATSON  2,709,680
SEWAGE DISPOSAL APPARATUS
Filed June 2, 1951  2 Sheets-Sheet 1

INVENTOR.
FRANK C. WATSON
BY Hudson, Boughton,
Williams, David + Hoffmann
ATTORNEYS

INVENTOR.
FRANK C. WATSON

United States Patent Office 2,709,680
Patented May 31, 1955

2,709,680

SEWAGE DISPOSAL APPARATUS

Frank C. Watson, North Jackson, Ohio, assignor to The Youngstown Welding & Engineering Company, Youngstown, Ohio, a corporation of Ohio Application June 2, 1951, Serial No. 229,566

11 Claims. (Cl. 210—2)

The present invention relates to a process and apparatus for the treatment and/or disposal of sewage, and more particularly, for the treatment and/or disposal of sewage of lake or seagoing vessels.

The principal object of the present invention is the provision of a new and improved process and apparatus for treating sewage of vessels so that it is sufficiently sterilized to meet the sanitary regulations covering the discharge of sewage from vessels in navigable waters in which the vessels travel, and contemplates pulverizing the sewage solids, applying a disinfectant or treating agent to the sewage, retaining the treated sewage in a container in contact with the treating agent for at least a period in which the sewage can be brought to the degree of purity required for its discharge from the vessel.

Another object of the invention is the provision of a new and improved apparatus for the treatment and/or disposal of sewage which is particularly suitable for use on vessels and which comprises a receiving tank for raw sewage, a pulverizer associated with the discharge of the receiving tank to pulverize the sewage solids collected in the tank, a contact tank to receive the sewage from the pulverizer and from which treated sewage is discharged from the vessel, a chemical feeder for mixing disinfecting chemicals with the sewage directed into the contact tank, and control means to limit the transfer of sewage to the contact tank to a predetermined quantity within a given predetermined period to assure treating of the sewage in the contact tank for at least a predetermined minimum period.

Still another object of the invention is the provision of a new and improved sewage treating and/or disposal apparatus of the character referred to having intermittently operated means for transferring sewage from the receiving tank to the contact tank upon each operation of the transfer means, and means to limit the frequency of the operation of the transfer means to a predetermined minimum period and wherein the capacity of the contact tank is such, in relation to the amount of sewage transferred thereto, that the sewage and disinfecting agent are retained in the contact tank for a period adequate to disinfect the sewage to the degree of purity required before discharge from the vessel. Preferably, the contact tank is arranged to provide a plurality of connected compartments, each of a capacity slightly more than the volume of sewage transferred to the contact tank during one period of operation of the transfer means, whereby the sewage is caused to pass successively through the compartments in batches.

A further object of the invention is the provision of a new and improved sewage treating and/or disposal apparatus of the character referred to which can be controlled to bypass sewage around the contact tank and overboard, and to selectively draw off sewage from the contact tank, including any of the individual compartments thereof, and direct such sewage overboard, whereby the apparatus can be cleared of sewage in waters in which treatment of the sewage by disinfecting agents is not required, thus providing a large sewage retention capacity for periods when the vessel is in highly restricted areas in which the discharge of sewage of any type is prohibited. Alternatively, sewage in any compartment of the contact tank can be returned to the receiving tank or otherwise retreated.

A still further object of the invention is the provision of a new and improved sewage treating and/or disposal apparatus of the character mentioned which can be controlled automatically or manually, and which may be provided with signals at remote points, such as the bridge or engine room of the vessel, to indicate the operative condition of the apparatus.

Figure 2:
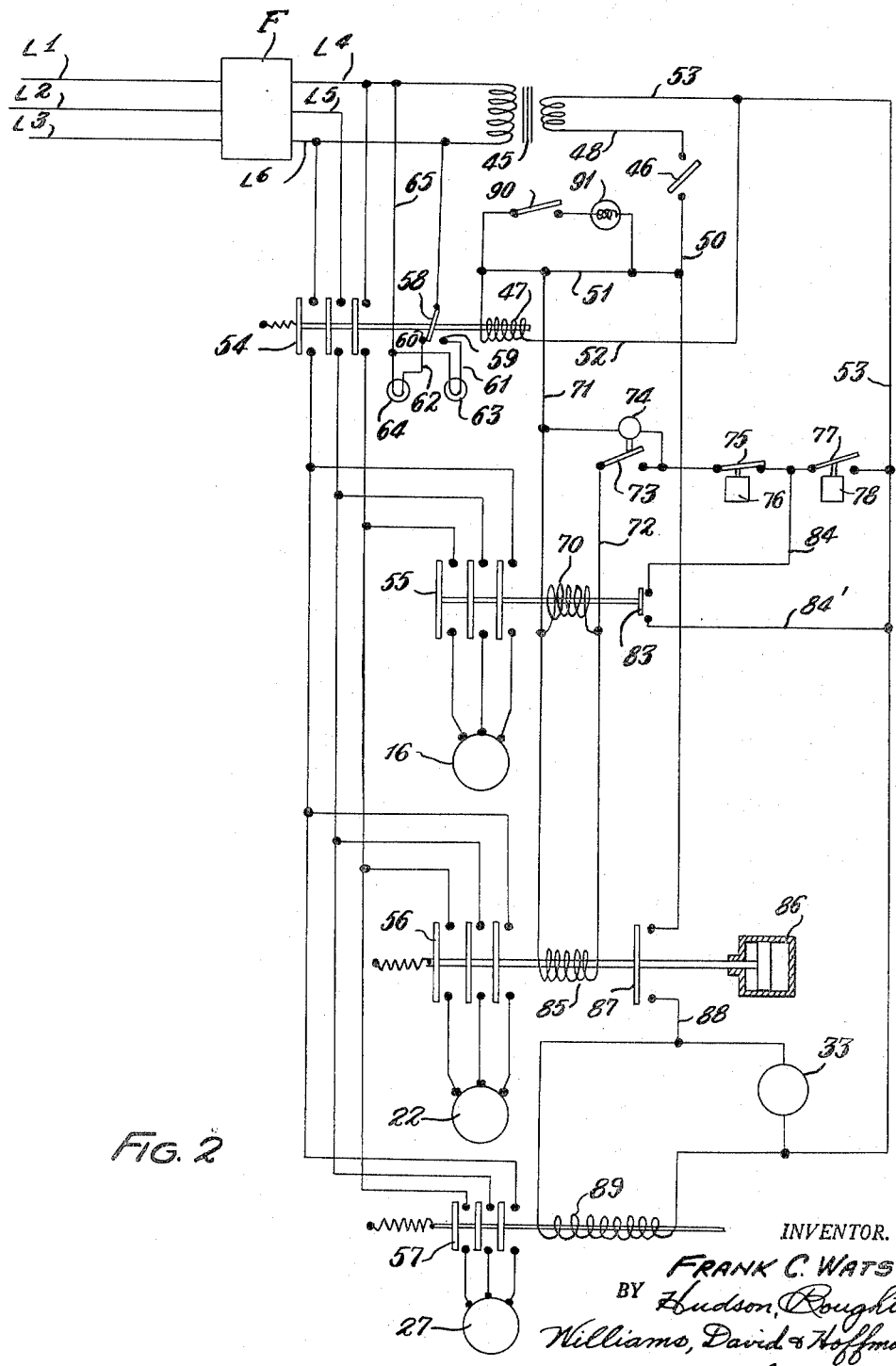

The invention resides in certain processes, constructions and combinations and arrangements of parts and further objects and advantages will be apparent to those skilled in the art to which it relates from the following description of the preferred embodiment described with reference to the accompanying drawings forming a part of this specification, in which Fig. 1 is a schematic view of a sewage disposal apparatus embodying the invention, and Fig. 2 is a wiring diagram for the controls of the apparatus shown in Fig. 1.

Although the invention is susceptible of uses in different environments, it is particularly suitable for use on vessels and is herein shown and described as such. It is to be understood that it may be desirable to employ more than one apparatus on certain vessels, and the disposition of the apparatus may be as conditions indicate. The apparatus shown comprises a raw sewage receiving tank A and a holding or contact tank B supported by a suitable frame structure D on the deck 10. The tank A is preferably formed of a non-corroding material, such as Monel metal, and it is preferably located below all sewage sources in the vessel. Raw sewage is fed to the tank A through an inlet sewage line 11 which communicates with the various sewage sources throughout the vessel. Preferably, kitchen sewage is first passed through a suitable grease trap, not shown, before discharging into the tank. The bottom of the tank is preferably funnel-shaped and has an outlet opening 12, as shown. The tank is vented to atmosphere through a pipe 13 connected with the top thereof. In the form shown, a combination sight glass and hand hole 14 are provided in the tank walls for observation of and access to the interior of the tank.

The receiving tank A is provided with a power-operated sewage agitator comprising a rotatable shaft 15 driven by an electric motor 16 supported on the top of the tank. The shaft 15 is supported in a tubular bearing member 17 attached to the top wall of the tank, and has blades 19 which agitate the sewage when the motor is operated and cause dispersion of the solids throughout the body of sewage. Alternatively, any other suitable agitator could be employed.

A sewage pulverizer 20 is associated with the outlet 12 of the tank A and is operative to pulverize sewage accumulated in the tank as it discharges therefrom. As shown, the intake of the pulverizer is connected with the outlet at the bottom of the tank. Preferably, a hand-controlled valve 21 is interposed between the tank outlet and the pulverizer intake. The pulverizer 20 may be of any suitable design, such as those which are commercially available, and it is driven by an electric motor 22.

The pulverizer 20 discharges sewage, including the pulverized matter, into a pipe line 25 connected to the intake of a suitable pump 26 driven by an electric motor 27 and which is adapted to force the sewage through a pipe line 28 to the contact or holding tank B. The pump 26 operates simultaneously with the pulverizer 20, as is explained more fully hereinafter, and, alternatively, a combination pulverizer and pump unit could be substituted for the individual pulverizer and pump shown.

Suitable treating agents, such as sodium hypochlorite and sulfuric acid are added to the sewage moving to the contact tank B, preferably by injection into the pipe line 28 at a point adjacent to the tank inlet by a feeder or pump 32 driven by an electric motor 33. However, any other suitable agents or feeding device could be employed. In the present embodiment, the feeder 33 draws the treating agents from a container 35 and discharges them into the pipe line 28 through a pipe 36.

The contact tank B has transversely extending partitions 40 and baffles 41 therein arranged to provide three compartments c, d and e which are separated by the partitions 40. The partitions 40 extend from the bottom of the tank upwardly and terminate slightly from the top of the tank so that sewage in one compartment cannot pass to the next until the initial compartment is filled and overflows the top of the partition separating the two compartments. The baffles 41 extend from the top of the tank downwardly into the central portions of the respective compartments and terminate short of the bottom of the tank so that the sewage passing through each compartment must travel from the top to the bottom portion and return, which assures that all of the sewage remains in each compartment at least for the time required to fill the compartment. It will be seen that when sewage is fed into compartment c the sewage standing in the compartment is displaced into compartment d and the sewage displaced from compartment d enters compartment e and displaces sewage from the latter compartment out of the tank through a discharge pipe 42. The number of compartments formed by the partitions 40 may vary as desired, and in the present embodiment three such compartments are adequate.

Preferably, three hand holes 43 are provided in the sides and end of the contact tank, and two draw-off valves 44 for drawing samples of treated sewage for test purposes are provided at the ends of the tank near the top thereof.

The operation of the agitator motor 16, pulverizer and pump motors 22, 27, 33 are normally automatically controlled by a control system, which system is shown diagrammatically in Fig. 2. Although any suitable electric power supply can be employed, in the form shown direct current from the generator of the vessel is supplied through power lines L1, L2 and L3 to a converter F which converts the current to a suitable A. C. voltage, such as 220 volts, 60 cycle, three-phase current, which is available through lines L4, L5 and L6. This current is used for operating the agitator motor 16 and pulverizer and pump motors 22, 27 and furnishes current to the primary of a step-down transformer 45 through the lines L4, L6, which transformer provides 110-volt current to the control system and to the disinfectant feeder pump motor 33. Preferably, the power supply to the motors 16, 22, 27 and the control system is controlled by means including a hand or automatic selector switch 46 which is connected in the circuit of the secondary of the transformer 45 and is manually operated to close and complete a circuit for a control relay solenoid 47. The solenoid circuit includes one side of the secondary, wire 48, switch 46, wires 50, 51, solenoid 47 and wires 52, 53 to the secondary. When energized the solenoid 47 closes a normally open three-pole contactor 54 connected in lines L4, L5, L6 to establish current supply to contacts 55, 56, 57 which control the circuits of motors 16, 22, 27 respectively. It will be seen that when switch 46 is open, the control circuit is open and the power supply for motors 16, 22, 27 is broken at contactor 54.

Preferably a signal device is provided to indicate the operative condition of the control system, and the device includes a contact 58 connected to line L6 and movable between fixed contacts 59, 60 by the armature of the solenoid 47. Contacts 59, 60 are connected to wires 61, 62 respectively, and wire 61 is connected to one terminal of a signal lamp 63 and wire 62 is connected to one terminal of a signal lamp 64, the other terminals of which lamps are connected by a wire 65 to line L4. The lamps 63, 64 are distinctive; for example, one may be red and the other green and are located in any part of the vessel desired, such as in the engine room or on the bridge. The contact 58 is normally biased to engage contact 60 and is moved to engage contact 59 when the solenoid 47 is energized. It will be seen that lamp 63 is lit when the control system is set for automatic operation and lamp 64 is lit when the control circuit is inoperative.

As mentioned hereinbefore, the circuit for the agitator motor 16 is controlled by contactor 55 which is normally open and is closed by a solenoid 70 when the latter is energized. The circuit for solenoid 70 includes wire 48, switch 46, wires 50, 51, 71, solenoid 70, wire 72, contact 73 of a time operated switch 74, contact 75 of a low level switch 76, contact 77 of a high level switch 78, to wire 53.

The contact 73 is operated by a suitable timing mechanism 74 which, in the form of the invention shown, is electrically powered and one lead thereof is connected to wire 71 and the other lead is connected in series with contact 75. The timing mechanism is such that when it is energized it closes contact 73 for a period of six minutes, after which it opens the contact and is then arranged to hold the contact open for at least a predetermined period. In the present form of the invention contact 73 is not reclosed by the timing mechanism until at least thirty minutes following the opening thereof. Preferably, the contact 73 can be closed manually independently of the timing mechanism to by-pass the timing operation of the switch when manual control of the system is called for. The details of the timing mechanism 74 are not shown since suitable mechanism of this type is available commercially.

The low level control switch 76 includes mechanism to actuate the contact 75 thereof to maintain the contact closed when the level of the sewage is above line b and to open the contact when the level of the sewage falls below line b. The details of the mechanism are not shown, but suffice it to say they include an electrode 80 which depends into the tank A and the lower end terminates at the line b.

The contact 77 of the high level switch 78 is actuated by mechanism similar to that which actuates contact 75 and includes an electrode 81 which depends into the tank A and terminates at the level indicated by the line a. The mechanism 78 closes contact 77 when the level of the sewage rises to the bottom end of the electrode 81 and reopens the contact when the sewage level falls below the end of the electrode. The control circuit is maintained around contact 77 by a contact 83 which closes a holding circuit through wires 84, 84' when the solenoid 70 is energized.

It will be seen that when the sewage level in tank A reaches the point indicated at line a, contact 77 is closed and a circuit is established from the secondary of transformer 45 through wire 48, switch 46, wires 50, 51, 71, timer mechanism 74, contacts 75, 77 and wire 53 to the secondary. The timer mechanism 74 closes contact 73, providing at least thirty minutes has elapsed since the contact was opened, and establishes a circuit from wire 71 through solenoid 70, wire 72, contacts 73, 75, 77 to wire 53. Solenoid 70 closes contactor 55 and holding contact 83, thereby energizing the agitator motor 16. The motor 22 for the pulverizer 20 is controlled by the normally open contactor 56 which is closed by a solenoid 85 when the latter is energized and this solenoid is connected to wires 71, 72 in parallel with solenoid 70. The operation of the solenoid 85 to close contactor 55 is delayed for a brief period, for example forty-five seconds, by a time delay device such as a dashpot 86. By this arrangement the agitator motor 16 is operated in advance of the operation of the pulverizer and pump motors 22, 27 to agitate the sewage in the tank A and thereby disperse the solids therein throughout the effluent for more efficient operation of the pulverizer.

The solenoid 85 operates a contactor 87 to complete a circuit from the secondary of transformer 45 through wire 48, switch 46, wire 50, contactor 87, wire 88, solenoid 89, wire 53 to the secondary. Solenoid 89 closes contactors 57 to establish the circuit for the pump motor 27. A circuit parallel to that through solenoid 89 is also established through the chemical feeder motor 33 by closure of contactor 87. The pump 26 is operated by motor 27 to pump the sewage issuing from the pulverizer through pipe line 28 to the contact tank B and the disinfectant feeder pump 32 injects the disinfectant agent into the sewage passing to the tank.

The timer mechanism 74 is set to close contact 73 for approximately the time required for the pulverizer and pump 26 to remove a volume of sewage from the tank A equal to that between the levels $a$ and $b$, plus the preliminary operating period for the agitator motor 16 described hereinbefore. When the circuits for the solenoids 70, 85 are broken by reopening of contact 73, the contactors 55, 56, 87, 57 are opened to deenergize motors 16, 22, 27, 32. Should the sewage level be lowered to the point $b$ before contact 73 is opened, contact 75 is opened by the mechanism 76 and the control circuit is opened to deenergize solenoids 70, 85, which deenergizes the solenoid 89 and therefore the motors just mentioned.

In the form of apparatus shown, the capacity of the pulverizer 20 and the pump 26 is approximately ten gallons per minute and the volume of sewage between the levels $a$, $b$ is approximately fifty gallons. It follows, therefore, that approximately five minutes is required to lower the sewage level from the point $a$ to point $b$. The capacity of the contact tank B is preferably four times that of the volume or batch pumped from tank A during a normal operating period or cycle of the pulverizer and pump 26, and the capacity of each of the compartments $c$, $d$, $e$ of the contact tank 30 is approximately one-third that of the tank B. Since the timer mechanism 74 maintains the contact 73 open for at least a thirty-minute period following an operative cycle of the apparatus, the time required for the passage of sewage through the three compartments of the contact tank will be at least two hours. This period provides the necessary contact between the disinfectant agent and the sewage to bring the purity of the effluent to the degree generally required for its discharge from the vessel. Alternatively different times of periods of operation of the pulverizer and pump can be had by varying the capacity of the tanks A and B or that of the pulverizer 20 and pump 26.

Preferably, tank A is capable of holding more than twice the volume contained between the levels $a$ and $b$ to take care of temporary excesses of sewage. In addition, a sewage level sensitive switch 90 is connected in series with a signal device, such as an electric alarm 91, and the switch 90 is adapted to be closed by mechanism, including an electrode 92 which depends into the tank A and the bottom of which is spaced slightly from the top of the tank, when the sewage level reaches the bottom of the electrode. The alarm 91, or a plurality thereof, can be located at any suitable point or points on the vessel, such as on the bridge and in the engine room, and preferably adjacent the control switch 46, so that the system can be turned to hand operation and start the cycle by bypassing timer 74 and allowing the control units to operate before the tank overfills.

It is to be understood that suitable manual control switches for individually controlling the operation of the motors 16, 22, 27, 32 can be provided, but for the sake of clarity are not shown.

In some instances the sewage may be adequately treated merely by pulverizing the solids and without subjecting the sewage to disinfecting chemicals, and in such event the sewage can be bypassed around tank B to discharge pipe 42 through a pipe line 95. The flow of sewage through the pipe line 28, tank B and pipe line 95 is controlled by valves 96, 99, 100, and to divert sewage around the tank and through pipe line 95, valves 96, 100 are closed and valve 99 is opened.

It may also be desirable, at times, to remove sewage from the compartments $c$, $d$, $e$, and for this purpose a pipe line 105 is provided which is connected to the bottoms of the respective compartments through branch pipes 106, 107, 108, which pipes include valves 110, 111, 112, respectively. One end of pipe 105 is connected to the intake of pump 26, and a valve 114 is provided therein adjacent to the connection. Preferably, a valve 115 is located at the discharge of the pulverizer 20 so that pump 22 can be operated to pump out the compartments of tank B. In the form shown, valve 115 is a three-way valve having provision for drawing off sewage to test the same to determine the operating efficiency of the system from time to time. The sewage pumped from the contact tank B can be directed overboard through pipe line 95, or if it includes solid matter, it can be directed back into the receiving tank A to be ground in the pulverizer 20 through a branch pipe 118 connected to pipe line 28 and emptying into the receiving tank A. A valve 120 is located in pipe 118, and is normally closed except when sewage from the pump 26 is to be directed into tank A. In this event valve 120 is opened and valves 96, 99 are closed.

Preferably, the apparatus can be flushed with hot water and steam, and for this purpose pipe 105 is connected through a valve 122 with a pipe 123 leading to a boiler, not shown. Pipe 95 is connected to a pipe 124, through a valve 125, which pipe is also connected with the boiler, and a branch 127, having a valve 128 therein, interconnects pipe 124 with the tank A. The pulverizer 20 can be flushed by directing steam from the boiler through a pipe 130, having a control valve 131 therein and flushing water therein through pipe 133 having a control valve 132. It will be apparent that by opening and closing the appropriate valves in the pipe lines described, the entire system can be quickly flushed and cleaned by steam and water.

Sight glasses S are preferably located at various points throughout the pipe lines for ease of checking the flow of sewage, etc. through the apparatus.

From the foregoing it will be apparent that the objects enumerated, as well as others, have been achieved and that there is provided a new and improved process and apparatus particularly suitable for use in treating sewage on lake and seagoing vessels. The apparatus may be set for automatic operation or it may be operated manually, as desired, and the control thereof may be effected from a remote point. The degree of treatment of the sewage before discharge overboard can be controlled to suit unusual conditions as they arise, and when the apparatus is operating automatically, full and effective treatment of the sewage is assured. The apparatus can be operated, for example, to discharge the sewage from the tank A and compartments of tank B into unrestricted areas prior to entering highly restricted waters where discharge of sewage of any type is prohibited, and the receiving and storage tanks can retain all sewage for several hours without discharging overboard. In the preferred form of the invention, the sewage is transferred in batches from the receiving tank to the contact tank, but alternatively it could be transferred by a continuous operation having control means to limit the volume transferred in any given period whereby adequate treatment of the sewage in the contact tank is assured.

While the preferred form of the invention has been described in considerable detail, it will be apparent that the invention is not limited to the processes and constructions shown, and it is my intention to cover hereby all adaptations, modifications and changes therein which come within the practice of those skilled in the art to which the invention relates and the scope of the appended claims.

I claim:

1. A sewage disposal apparatus comprising, a sewage receiving tank, a treating tank, a conduit interconnecting said tanks, power means including a pulverizer to direct a predetermined maximum volume of sewage from said receiving tank through said conduit to said treating tank, means responsive to a predetermined volume of sewage in said receiving tank to initiate operation of said power means, and means to limit the frequency of operation of said power means irrespective of the operative condition of the second mentioned means.

2. A sewage disposal apparatus comprising, a sewage receiving tank, a treating tank, a conduit interconnecting said tanks, power means including a pulverizer to direct sewage from said receiving tank through said conduit to said treating tank, means responsive to a predetermined level of sewage in said receiving tank to initiate operation of said first mentioned means, means responsive to a predetermined lower level of sewage in said receiving tank to terminate operation of said first mentioned means, and timing means to limit the frequency of operation of said first mentioned means irrespective of the operative condition of the second mentioned means.

3. A sewage disposal apparatus comprising, a sewage receiving tank, a treating tank, a conduit interconnecting said tanks, power means including a pulverizer to direct sewage from said receiving tank through said conduit to said treating tank, means responsive to a predetermined level of sewage in said receiving tank to initiate operation of said power means, and timing means for automatically terminating operation of said power means a predetermined time after initiation of the operation of said power means.

4. A sewage disposal apparatus comprising, a sewage receiving tank, a treating tank, a conduit interconnecting said tanks, power means including a pulverizer to direct sewage from said receiving tank through said conduit to said treating tank, means responsive to a predetermined level of sewage in said receiving tank to initiate operation of said power means, timing means to terminate operation of said power means a predetermined time after initiation of the operation of said power means, and means to prevent reoperation of said power means within a predetermined period following termination of operation of said power means.

5. A sewage disposal apparatus comprising, a sewage receiving tank, a treating tank, a conduit interconnecting said tanks, power means including a pulverizer having its inlet connected with an outlet of the receiving tank to direct sewage from said receiving tank through said conduit to said treating tank, and a power-driven agitator in said receiving tank to agitate the sewage in said receiving tank, means to initiate operation of said agitator in response to a predetermined volume of sewage in said receiving tank, and means to initiate operation of said power means a predetermined period following initiation of said agitator, and means to limit the frequency of operation of said power means.

6. A sewage disposal apparatus for a vessel comprising, a sewage receiving tank, a treating tank, a conduit interconnecting said tanks, power means including a pulverizer and a pump to direct a predetermined maximum volume of sewage from said receiving tank through said conduit to said treating tank during an operating period of said power means, means responsive to a predetermined volume of sewage in said receiving tank to initiate operation of said first mentioned means, said treating tank having a volume at least three times said predetermined volume of sewage directed by said power means from the said receiving tank to said treating tank, said treating tank having a series of adjacent compartments, means effecting communication alternately between the top and bottom of adjacent compartments, a pipeline connected with the individual compartments of said treating tank and adapted to discharge into the intake of said pump, and a pipeline communicating with the discharge of said pump and by-passing said treating tank to discharge from the vessel, said pipeline including a cut-off valve.

7. A sewage disposal apparatus for a vessel comprising, a sewage receiving tank, a treating tank, a conduit interconnecting said tanks, power means including a pulverizer and a pump to direct a predetermined maximum volume of sewage from said receiving tank through said conduit to said treating tank during an operating period of said power means, means responsive to a predetermined volume of sewage in said receiving tank to initiate operation of said first mentioned means, said treating tank having a volume at least three times said predetermined volume of sewage directed by said power means from the said receiving tank to said treating tank, said treating tank having a series of adjacent compartments, means effecting communication alternately between the top and bottom of adjacent compartments, a pipeline connected with the individual compartments of said treating tank and adapted to discharge into the intake of said pump, and a pipeline communicating with the discharge of said pump and said receiving tank and including a cut-off valve.

8. A sewage disposal apparatus comprising, a sewage receiving tank, a treating tank, a conduit interconnecting said tanks, power means including a pulverizer to direct a predetermined maximum volume of sewage from said receiving tank through said conduit to said treating tank, means responsive to a predetermined volume of sewage in said receiving tank to initiate operation of said power means, and means to prevent reoperation of said power means within a predetermined period following termination of operation of said power means, said treating tank having a volume at least three times the first mentioned predetermined maximum volume of sewage.

9. A sewage disposal apparatus comprising a sewage receiving tank, a treating tank, a conduit interconnecting said tanks, power means including a pulverizer to direct sewage from said receiving tank through said conduit to said treating tank, means responsive to a predetermined high level of sewage in said receiving tank to initiate operation of said power means, means responsive to a predetermined lower level of sewage in said receiving tank to terminate operation of said power means, and timing means to prevent reoperation of said power means within a predetermined period following termination of operation thereof, said treating tank having a volume of at least three times the volume of said receiving tank between said high and low levels in said receiving tank.

10. A sewage disposal apparatus comprising, a sewage receiving tank, a treating tank, a conduit interconnecting said tanks, power means including a pulverizer to direct sewage from said receiving tank through said conduit to said treating tank, means responsive to a predetermined high level of sewage in said receiving tank to initiate operation of said power means, time means to terminate operation of said power means after a predetermined operating period thereof, and timing means to prevent reoperation of said power means within a predetermined period following termination of operation thereof, said treating tank having a volume of at least three times the volume of said receiving tank between said high and low levels in said receiving tank.

11. A sewage disposal apparatus comprising a sewage receiving tank, a treating tank, a conduit interconnecting said tanks, power means including a pulverizer to direct sewage through said conduit to said treating tank, means to initiate operation of said power means in response to the volume of sewage in said receiving tank, means to terminate operation of said power means in response to a smaller volume of sewage in said receiving tank, means to terminate operation of said power means after a predetermined volume of sewage has been acted upon by said power means, means for limiting the frequency of operation of said power means, and means for purifying sewage in said treating tank.

References Cited in the file of this patent

UNITED STATES PATENTS

| | | |
|---|---|---|
| 292,046 | Powers | Jan. 15, 1884 |
| 1,291,628 | Parsons | Jan. 14, 1919 |
| 2,131,711 | Porteous | Sept. 27, 1938 |
| 2,358,841 | Walker | Sept. 26, 1944 |
| 2,434,027 | Whittington | Jan. 6, 1948 |

FOREIGN PATENTS

| | | |
|---|---|---|
| 307,561 | Great Britain | Mar. 14, 1929 |